Figure 1:
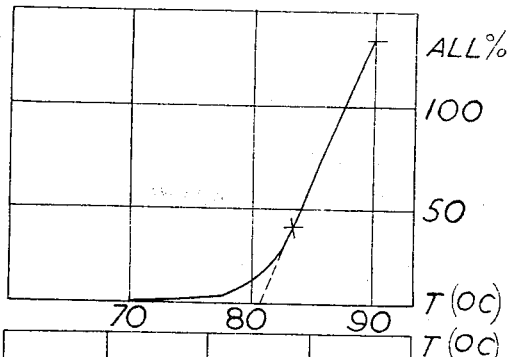

Inventor
Alphonse Faure

United States Patent Office 3,287,447
Patented Nov. 22, 1966

3,287,447
POLYVINYL CHLORIDE COMPOSITIONS
Alphonse Faure, Lyon, France, assignor to Rhone-Poulenc S.A., Paris, France, a French body corporate
Filed Feb. 24, 1964, Ser. No. 349,527
Claims priority, application France, Feb. 22, 1963, 925,740; Apr. 8, 1963, 930,771
7 Claims. (Cl. 260—899)

The present invention relates to polyvinyl chloride compositions and shaped articles, especially filaments, fibres, bristles, and yarns, hereinafter referred to generically as "fibres," made therefrom.

Vinyl chloride may be polymerized under a variety of different temperature conditions, which may be classified as follows.

(1) The polymerization is generally effected, especially for economic reasons, in bulk, solution, suspension or, preferably, emulsion, at a temperature above 40° C., generally between 40° and 70° C. Such polyvinyl chloride, hereinafter referred to as "hot" polyvinyl chloride or "hot" polymer, is employed inter alia for the manufacture of yarns, films and moulded objects, but in these applications it has the disadvantage of becoming deformed and shrinking at relatively low temperatures.

(2) Vinyl chloride may also be polymerized at below 0° C. (generally from −5° to −30° C.) in bulk, solution, emulsion or suspension. Polyvinyl chlorides thus prepared, hereinafter referred to as "cold" polyvinyl chloride or "cold" polymer, have much better resistance than "hot" polyvinyl chloride to deformation at elevated temperatures. However, they have the disadvantage, as compared with such polyvinyl chlorides, that they are much more costly to prepare because it is necessary to provide cooling means for their preparation. In addition, they are less readily soluble in the solvents usually employed for dry spinning.

(3) Vinyl chloride has also been polymerized at temperatures between 0° and 40° C. The properties of the polymer thus obtained, hereinafter referred to as "tepid" polyvinyl chloride or "tepid" polymer, are midway between those of the two aforesaid types of polymer.

It has now been found that when a polyvinyl chloride prepared at above 0° C. is mixed with a polymer prepared at a substantially lower temperature, the mixture obtained possesses properties, more especially thermomechanical properties, which cannot be deduced from the normal rule governing mixtures. In other words, the properties of these mixtures are not simply the arithmetical mean of the properties of the constituents.

The invention accordingly provides polyvinyl chloride compositions comprising two forms of polyvinyl chloride prepared by polymerization of vinyl chloride at substantially different temperatures, one or both of the said forms having been prepared at above 0° C. Such mixtures may be distinguished from unmixed polyvinyl chlorides by comparing their thermomechanical properties with the results obtained by a differential thermal analysis. For example, it has been found that a small proportion of "cold" polyvinyl chloride added to "hot" polyvinyl chloride is sufficient considerably to improve the behaviour of the latter at elevated temperatures, and that conversely relatively large quantities of "hot" polyvinyl chloride may be incorporated in "cold" polyvinyl chloride without impairing substantially the useful properties of the latter.

The invention thus makes it possible more especially to use relatively large proportions of the relatively inexpensive "hot" or "tepid" polymer with small proportions of the relatively costly "cold" polymer, to obtain at reasonable cost mixtures whose thermal properties are satisfactory, especially for textile uses. It also makes it possible to add, mainly for economic reasons, a certain proportion of "tepid" or "hot" polymer to a "cold" polymer without substantial impairment of the latter's properties.

The compositions of the invention preferably comprise either from 60 to 98% of "hot" polymer and from 40% to 2% of "cold" or "tepid" polymer, or from 75 to 95% of "cold" polymer with 25 to 5% of "hot" or "tepid" polymer; but useful results are obtained when the compositions contain 2 to 95% of the form of polymer prepared at the higher temperature and 98 to 5% of the other.

As has been stated, the thermomechanical properties of the mixtures are better than could be expected if only the arithmetical mean of the properties of the constituents of the mixture were considered. However, it is obvious that two appreciably different polymers must be mixed if the improved properties of the mixture are to be substantially different from what would have been expected. Generally speaking, a difference in polymerization temperature of the constituents of about 30° C. is sufficient for mixtures of "hot" and "tepid" polymers, and a difference of polymerization temperature of about 20° C. is sufficient for mixtures of "tepid" and "cold" polymers.

It is obvious that for each application of the mixture, the nature and amount of the constituent polyvinyl chlorides chosen depends upon the desired properties of the final mixture.

The various polyvinyl chlorides which can be used in the invention may be characterized essentially by their polymerization temperature and, if necessary, by their viscosity number (defined in accordance with the French standard AFNOR T51.013). In practice, polyvinyl chlorides will normally be employed which have been prepared between 80° and −30° C. and whose AFNOR viscosity numbers are between 80 and 600.

The thermomechanical properties of the various polymers employed may be assessed by determining their "Vicat point," their deformation temperature and their elongation at 90° C. This may be done as follows.

(a) *Determination of the Vicat point.*—This determination is carried out in accordance with the standard ASTM-D-1525-58 T.

(b) *Determination of the deformation temperature and elongation at 90° C.*—This measurement is effected in the following way. 25 g. of polyvinyl chloride are placed in a square frame having an internal side length of 100 mm. and a height of 2 mm. between two metal plates and brought to a pressure of 900 kg./cm.$^2$ at 180–190° C. for 5 minutes. The assembly is cooled, while this pressure is maintained. There is thus obtained a plate measuring 100 x 100 x 2 mm. From the plates thus obtained are cut test pieces of 20 x 5 mm., and thickness 2 mm. The test pieces are drawn under a load of 5 kg. (i.e. 50 kg./cm.$^2$) in an oil bath, the temperature of which rises by 1.6° per minute. The temperature T at which the test piece begins to be linearly elongated as a function of the temperature is found. The elongation (expressed as a percentage) is plotted as a function of the temperature on a graph of the kind shown in FIGURE 1 of the accompanying drawings. The temperature T is defined by the intersection of the rectilinear portion of the curve with the zero ordinate of the elongation. The temperature T is a measure of the deformation temperature of the material. The elongation (expressed as a percentage) at a temperature of 90° C. is also noted.

The following Table 1 sets out the characteristics of the polymers which may be used in the invention.

TABLE 1

|  | "Hot" polymer | "Tepid" polymer | "Cold" polymer |
|---|---|---|---|
| Polymerisation temperature | <40° C., generally 40–80° C. | 0–40° C. | <0° C., generally 0 to −30° C. |
| Vicat point | >95° C. | Intermediate properties. | >120° C. |
| Deformation temperature in ° C. | 75–78° C. | | 84–88° C. |
| Elongation at 90° C. in percent | 135–290 | | 7–4. |

The following Examples A to D describe the preparation of particular polymers which may be employed in the invention.

(A) *Preparation of a "hot" polyvinyl chloride.*—Into an enamelled 25 litre autoclave flushed with nitrogen are charged 8 g. of lauroyl peroxide, and then 4.55 kg. of vinyl chloride and 10 litres of water containing 20 g. of polyvinyl alcohol (saponification number 100 viscosity of the 4% solution in water at 20° C.=25 centipoises) are introduced. Stirring is started and the mixture is heated to 60–61° C. for 4 hours, 50 minutes. The operation is stopped, the residual vinyl chloride is removed and the product is separated, washed and dried. 2.7 kg. of polyvinyl chloride having a viscosity number of 103 are obtained.

(B) *Preparation of a "cold" polyvinyl chloride (viscosity number=109).*—Into an enamelled 25 litre autoclave flushed with nitrogen and cooled at −10° C. are charged 12 litres of water, containing 2.4 kg. of sodium chloride and buffered to a pH of 5 with 120 g. of potassium acid phthalate and 21 g. of caustic soda, 4.9 kg. of vinyl chloride, 1.715 kg. of chloroform, 9 g. of sodium peroxide, 24 cc. of trichloroacetyl chloride and 60 cc. of a 40% aqueous solution of polyvinyl alcohol (saponification number 250, viscosity 2 centipoises). The reaction mass is maintained at −10° C. for 18 hours with stirring. 1.12 kg. of polyvinyl chloride, having a viscosity number of 109 are obtained.

(C) *Preparation of a "cold" polyvinyl chloride (viscosity number=124).*—The same procedure is followed as in (B), but using 1.286 kg. of chloroform, and the polymerization is stopped at the end of 13 hours. 1.52 kg. of polyvinyl chloride, viscosity number 124, are obtained.

(D) *Preparation of a "cold" polyvinyl chloride (viscosity number=395).*—The same procedure is followed as in (B), but the polymerization is effected for 13 hours, 30 minutes in the absence of chloroform. 2.83 kg. of polyvinyl chloride, viscosity number 395, are obtained.

Mixtures of the aforesaid polymers may be prepared as follows, for the determination of their thermomechanical properties.

The powdered polymers are introduced into a powder mixer in the proportions indicated in the tables, after the addition of 3% of a stabilising agent (based on a tin salt), and they are worked for half an hour at 200° C. in a roll-type mixer. The mixtures thus obtained are tested in the ways described above for the determination of the deformation temperature (T) and elongation at 90° C.

Mixtures are prepared from polymer A and either polymer B or polymer D. The graph in FIGURE 1 shows (as mentioned above) the manner in which the deformation temperature is determined (the figures given were obtained from a mixture of 85% of polymer A and 15% of polymer B).

Table 2 gives the properties of the mixtures of polymers A and B, and Table 3 gives the properties of the mixtures of polymers A and D.

TABLE 2

| Percentage of Polymer B in the mixture | Deformation Temperature (T) ° C. | Percent Elongation at 90° C. |
|---|---|---|
| 0 | 75.5 | 175 |
| 15 | 81 | 133 |
| 30 | 82 | 120 |
| 45 | 83 | 80 |
| 55 | 84 | 65 |
| 70 | 85.5 | 35 |
| 85 | 86 | 25 |
| 100 | 87 | 25 |

Figure 2:
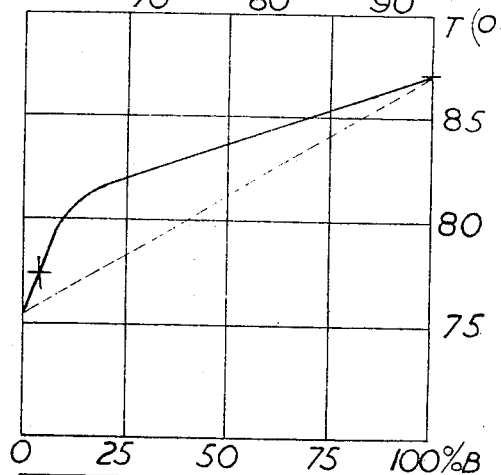

The deformation temperatures of Table 2 are plotted as a graph in FIGURE 2. It will be observed that the deformation temperatures, instead of being located on a straight line connecting the value for the polymer A with that for the polymer B, deviate considerably therefrom. Thus, it would be expected that an addition of 15% of "cold" polyvinyl chloride would give a deformation temperature of 77° C., but a temperature of 81° C. is in fact observed. Conversely, a percentage of 55% of "hot" polyvinyl chloride lowers the deformation temperature only from 87° to 84° C., instead of to 80.5° C. as was expected.

TABLE 3

| Percentage of Polymer D in the mixture | Deformation Temperature (T) ° C. | Percent Elongation at 90° C. |
|---|---|---|
| 0 | 75.5 | 175 |
| 10 | 79 | 142 |
| 20 | 80.5 | 127 |
| 40 | 82.5 | 75 |
| 60 | 84.5 | 45 |
| 80 | 86 | 25 |
| 100 | 88 | 10 |

Figure 3:
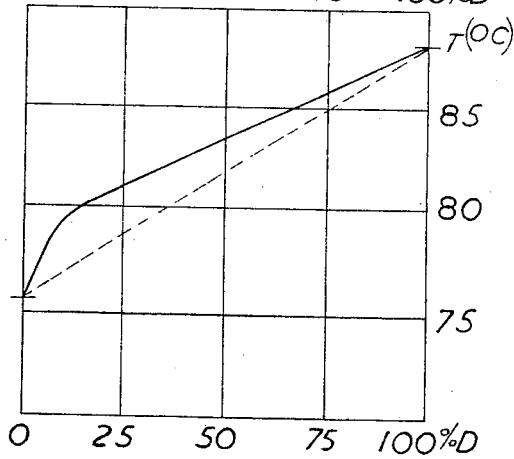

The deformation temperatures of Table 3 are plotted as the graph in FIGURE 3. It will be seen that the curve has the same general form as that of FIGURE 2.

These figures show that "cold" polyvinyl chlorides having very different viscosity numbers, and therefore very different molecular weights, behave identically on mixing with "hot" polyvinyl chlorides, and that advantageous mixtures can be obtained therefrom.

The compositions of the invention may be prepared, as already stated, by mixing powdered polymers and working them on a roll-type mixer, but other methods of mixing may also be employed. More especially, it is often convenient to prepare solutions or suspensions of the constituent polymers and to mix these solutions or suspensions.

Any of the usual stabilising agents, dyes, pigments, fillers or the like may be added to the compositions of the invention.

The new compositions may be shaped in any desired manner, depending on the application in view. More especially, the compositions may be made into, for example, foils, films, filaments, fibres, yarns, and bristles, which possess useful properties and can be made economically. Of these shaped articles, "fibres" (by which are meant any filaments, yarns, bristles, and fibres) are especially advantageous.

The nature and proportions of the polyvinyl chlorides used for producing a particular "fibre" can readily be selected having regard to the properties of the polymers and the desired qualities of the "fibre."

Mixtures intended for the manufacture of "fibres" are conveniently made by simply mixing appropriate solutions or suspensions of the various constituent polymers. Such mixtures may be spun by the usual methods for polyvinyl chloride, the solvent being, for example, carbon disulphide/acetone, perchloroethylene/acetone, tetrahydrofuran, cyclohexanone, benzene/acetone, dimethylformamide, propylene oxide, cyclopentanone, or a ternary mixture such as carbon tetrachloride/benzene/acetone.

"Fibres" may also be obtained from the new compositions by spinning suspensions of the polymers in liquids or mixtures of liquids having a swelling power but having no solvent power for the polymers, e.g. trichloroethylene, tetrachloroethane, chloroform, methylene chloride, acetone, benzene, toluene, methyl ethyl ketone, dioxan, ethyl acetate, ethyl benzene, methyltetrahydrofuran, and xylene.

After spinning, the "fibres" obtained may be stretched to impart an oriented structure thereto. This stretching may be carried out in various media, for example in a gas or a vapour, such as air or water vapour, or in a swelling or non-swelling liquid. It may also be carried out while the "fibre" is in contact with a heated surface. The stretching operation may take place either immediately the "fibres" leave the spinning chamber or in a separate operation. The stretching generally takes place at a temperature equal to or above 100° C.

The "fibres" may thereafter be subjected to a thermal treatment under tension at a temperature very near the decomposition temperature of the material. This heat setting treatment may be carried out in a gas, liquid or vapour, or in contact with a heated surface.

It is also possible to carry out, before or after the heat setting, an operation for relaxing the stretched "fibres," this relaxing operation having the effect of reducing the sensitivity of the "fibres" to heat. The extent to which this relaxation should be carried out varies in accordance with the effect desired. It may reach, for example, 30% if it is desired to have particularly stable "fibres."

The filaments, yarns, fibres and bristles obtained in accordance with the invention may undergo any appropriate textile treatment for facilitating their carding, combing, winding, weaving, knitting, or dyeing properties, and may be employed for the production of woven fabrics, knitted goods or unwoven articles, either alone or blended with other natural, artificial or synthetic "fibres."

The following examples describe certain preferred compositions in accordance with the invention. The parts and percentages are by weight unless otherwise stated.

*Example I*

A mixture consisting of 49 parts of polyvinyl chloride, obtained by polymerization at a temperature of −10° C. and having an AFNOR number of 120, and 51 parts of a vinyl chloride polymer, obtained by polymerization at about 55° C. and having an AFNOR number of 120, was prepared as a 25% solution of the polymers in a mixture in equal volumes of carbon disulphide and acetone. The solution was dry-spun into a chamber at 72° C., the spinneret temperature being 57° C.

The "fibre" obtained, after stretching in a ratio of 1 to 3 in hot air at 130° C., shrank by 30.7% in boiling water. It could withstand a thermal treatment at high temperature. For example, it was subjected under tension to a temperature of 135° C. for 5 minutes, and its shrinkage in boiling water was reduced to 18.3%. When it was relaxed by 10% at 130° C., followed by a treatment under tension for 5 minutes at 135° C., the shrinkage in boiling water of the "fibre" obtained was only 13.3%.

A "fibre" prepared under the same conditions, but from the "hot" polyvinyl chloride, exhibited a shrinkage of 50% in boiling water. Even after relaxation and setting under tension in hot air at 120° C., which was the maximum temperature which it could withstand, the "fibre" still had a shrinkage of 34%.

*Example II*

Polyvinyl chloride "fibres" were prepared by dry spinning a 25% solution of a mixture of equal parts of a polyvinyl chloride, having an AFNOR number of 121 and obtained by polymerization at a temperature between −5° and 0° C., a polyvinyl chloride, having an AFNOR number of 123 and obtained by polymerization at a temperature between −5° and 0° C., and a polyvinyl chloride, having an AFNOR number of 123 and obtained by polymerization at a temperature between 20° and 30° C., the solvent consisting of a mixture of equal volumes of perchloroethylene and acetone. The spinning chamber was at 125° C., with a spinneret temperature of 80° C. The "fibre" obtained, after stretching in a ratio of 1 to 4 in water at 100° C., shrank by 45% in boiling water.

It could withstand a thermal treatment at high temperature. For example, if it was treated for 6 minutes at 145° C., its shrinkage in boiling water was reduced to 14%.

A "fibre" prepared under the same conditions from the "tepid" polymer alone had after stretching and setting at 130° C., which was the maximum temperature which it could withstand, a shrinkage in boiling water of 30%.

*Example III*

Polyvinyl chloride "fibres" were prepared by dry spinning a 25% solution of a mixture of 51 parts of a polyvinyl chloride, having an AFNOR number of 120 and obtained by polymerization at about 55° C., and 49 parts of a polyvinyl chloride, having an AFNOR number of 145 and obtained by polymerization between 20° and 30° C., the solvent consisting of a mixture of benzene and acetone in equal volumes. The spinning chamber was at 110° C. with a temperature of 85° C. at the spinneret. The "fibre" obtained, when stretched in a ratio of 1 to 4 in steam at 100° C., shrank in boiling water by 39.5%. It could withstand a thermal treatment at high temperature. For example, after having been relaxed by 10% at 140° C. and heated under tension for 5 minutes at 140° C., its shrinkage in boiling water was reduced to 20%.

*Example IV*

Polyvinyl chloride "fibres" were prepared by wet-spinning a 25% solution of a mixture of 49 parts of a polyvinyl chloride, having an AFNOR number of 550 and obtained by polymerization at about −10° C., and 51 parts of a polyvinyl chloride, having an AFNOR number of 120 and obtained by polymerization at about 55° C., the solvent being cyclohexanone. The coagulation bath consisted of a mixture of sec-butyl alcohol and water in a ratio of 70:30, maintained at 40° C. The temperature at the spinneret was 95° C. The "fibre," stretched in a ratio of 1 to 7.5 in water at 100° C., shrank by 57.3% in boiling water. It could withstand a thermal treatment at high temperature. Thus, after having been heated under tension for 3 minutes at 160° C. its shrinkage in boiling water became 12.4%.

*Example V*

A mixture, in equal parts, of a polyvinyl chloride having an AFNOR number of 100 and obtained by polymerization at about 60° C., and a polyvinyl chloride having an AFNOR number of 105 and obtained by polymerization at 20° C., was malaxated with 2½ times its weight of acetone. The mass thus obtained was filtered and then extruded at a temperature of 75° C. under a pressure of 50 kg./cm.² through a spinneret having 40 holes, each 0.1 mm. in diameter, in a dry-spinning apparatus with a spinning chamber temperature of 98° C. The "fibre" obtained was stretched in a ratio of 1 to 4 in boiling water, relaxed by 10% at 135° C., and then heat set under tension at 135° C. for 6 minutes. Its shrinkage in boiling water is 28%, while the shrinkage of the "fibre" obtained under the same conditions from the "hot" polymer only, but set in tension in hot air at 110° C. (the maximum temperature which it withstands), is 40%.

*Example VI*

Polyvinyl chloride "fibres" were prepared by wet-spinning a 25% solution of a mixture of 10% of a polyvinyl chloride, having an AFNOR number of 550 and obtained by polymerization at —10° C., and 90% of a polyvinyl chloride, having an AFNOR number of 130 and obtained by polymerization at 25° C., the solvent being cyclopentanone. As coagulation bath there was employed a bath consisting of a mixture of methyl alcohol and water in a ratio of 60:40, maintained at 30° C. The temperature at the spinneret was 95° C. The "fibre" was stretched in a ratio of 1 to 9 in water at 100° C. and then had a shrinkage in boiling water of 62.1%. It could withstand a treatment under tension at 160° C. for 5 minutes, which reduced its shrinkage in boiling water to 13.5%.

A "fibre" obtained under the same conditions from the "tepid" polymer only, exhibited, after stretching in a ratio of 1 to 9 and thermal setting at 148° C., a shrinkage in boiling water of 18.2%.

*Example VII*

"Fibres" were prepared by dry-spinning a 25% solution of a mixture of 80% of a polyvinyl chloride, having an AFNOR number of 115 and obtained by polymerization at 0° C., and 20% of a polyvinyl chloride, having an AFNOR number of 120 and obtained by polymerization at about 55° C., the solvent consisting of a mixture in equal volumes of carbon disulphide and acetone. The spinning chamber was at a temperature of 75° C., and the temperature at the spinneret was 65° C. The "fibre" thus obtained was stretched in a ratio of 1 to 3.5 in boiling water and then exhibited a shrinkage in boiling water of 51%. After treatment under tension for 5 minutes at 150° C. the shrinkage in boiling water was only 8%.

A "fibre" prepared under the same conditions from the "cold" polymer only did not show lower shrinkage in boiling water.

*Example VIII*

Polyvinyl chloride "fibres" were prepared by dry-spinning a 25% solution of a mixture of 75% of polyvinyl chloride, having an AFNOR number of 132 and obtained by polymerization at about 25° C., and 25% of a polyvinyl chloride having an AFNOR number of 120 and obtained by polymerization at about 55° C., the solvent consisting of a mixture of equal volumes of carbon disulphide and acetone. The spinning chamber had a temperature of 75° C. and the temperature at the spinneret was 60° C. The "fibre" thus obtained was stretched in a ratio of 1 to 4 in boiling water and then had a shrinkage in boiling water of 61%. After stretching as described above, followed by a 10% relaxation and treatment under tension for 5 minutes at 145° C., the shrinkage in boiling water was only 18%.

A "fibre" prepared under the same conditions from the "tepid" polymer only did not exhibit lower shrinkage in boiling water.

I claim:

1. Polyvinyl chloride compositions comprising a homogenous mixture of 2 to 95% by weight of polyvinyl chloride prepared by the polymerization of vinyl chloride at 40° to 80° C. and 98 to 5% by weight of polyvinyl chloride prepared by the polymerization of vinyl chloride at —30° to 0° C., both the said polyvinyl chlorides having an AFNOR viscosity number between 80 and 600.

2. Polyvinyl chloride compositions comprising a homogenous mixture of 2 to 95% by weight of polyvinyl chloride prepared by polymerization of vinyl chloride at below 0° C. and 5% to 98% by weight of polyvinyl chloride prepared by polymerization of vinyl chloride at above 40° C.

3. Polyvinyl chloride compositions as claimed in claim 2 comprising 75 to 95% by weight of the said polymer prepared at below 0° C. and 25 to 5% by weight of the said polymer prepared at above 40° C.

4. Polyvinyl chloride compositions as claimed in claim 2 comprising 60 to 98% by weight of the said polymer prepared at above 40° C. and 40 to 2% by weight of the said polymer prepared at below 0° C.

5. Polyvinyl chloride compositions as claimed in claim 2 in which each polymer has an AFNOR viscosity number between 80 and 600.

6. Polyvinyl chloride compositions as claimed in claim 2 in which the polyvinyl chloride prepared at below 0° C. has been prepared at —30° to 0° C. and the polyvinyl chloride prepared at above 40° C. has been prepared at 40° to 80° C.

7. Filaments, fibres, bristles and yarns made of a polyvinyl chloride composition comprising a homogenous mixture of 2 to 95% by weight of polyvinyl chloride prepared by polymerization of vinyl chloride at below 0° C. and 5% to 98% by weight of polyvinyl chloride prepared by polymerization of vinyl chloride at above 40° C.

References Cited by the Examiner

UNITED STATES PATENTS

| | | | |
|---|---|---|---|
| 3,000,754 | 9/1961 | Zentmyer | 260—899 |
| 3,084,065 | 4/1963 | Bach | 260—899 |
| 3,168,594 | 2/1965 | Yuji Hoshi et al. | 260—899 |

MURRAY TILLMAN, *Primary Examiner.*

J. WHITE, *Assistant Examiner.*